United States Patent
Fuller et al.

(10) Patent No.: US 6,216,112 B1
(45) Date of Patent: Apr. 10, 2001

(54) METHOD FOR SOFTWARE DISTRIBUTION AND COMPENSATION WITH REPLENISHABLE ADVERTISEMENTS

(76) Inventors: William H. Fuller, 728 Middlecove, Plano, TX (US) 75023; Joel A. Pugh, 4707 Mill Run, Dallas, TX (US) 75244; Douglas E. Neel, 11037 Paddock Cir., Dallas, TX (US) 75238

(*) Notice: Subject to any disclaimer, the term of this patent is extended or adjusted under 35 U.S.C. 154(b) by 0 days.

(21) Appl. No.: 09/085,623

(22) Filed: May 27, 1998

(51) Int. Cl.[7] .................................................. G06F 17/60
(52) U.S. Cl. ............................................. 705/14; 705/400
(58) Field of Search ........................ 395/712; 705/14, 705/10, 1, 400; 377/13, 15

(56) References Cited

U.S. PATENT DOCUMENTS

| | | | | |
|---|---|---|---|---|
| 5,014,234 | * | 5/1991 | Edwards, Jr. | 713/200 |
| 5,564,073 | * | 10/1996 | Takahisa | 455/66 |
| 5,572,643 | * | 11/1996 | Judson | 709/218 |
| 5,579,537 | * | 11/1996 | Takahisas | 455/66 |
| 5,740,549 | * | 4/1998 | Reilly et al. | 705/14 |
| 5,765,141 | * | 6/1998 | Spector | 705/14 |
| 5,774,868 | * | 6/1998 | Cragun et al. | 705/10 |
| 5,774,869 | * | 6/1998 | Toader | 705/10 |
| 5,781,894 | * | 7/1998 | Petrecca et al. | 705/14 |
| 5,809,242 | * | 9/1998 | Shaw et al. | 395/200.47 |
| 5,848,397 | * | 12/1998 | Marsh et al. | 705/14 |
| 5,854,897 | * | 12/1998 | Radziewicz et al. | 395/200.54 |
| 5,903,721 | * | 5/1999 | Sixtus | 395/187.01 |
| 5,913,030 | * | 6/1999 | Lotspiech et al. | 395/200.33 |
| 5,918,014 | * | 6/1999 | Robinson | 395/200.49 |
| 5,918,214 | * | 6/1999 | Perkowski | 705/27 |
| 5,919,247 | * | 7/1999 | Van Hoff et al. | 709/217 |
| 5,937,037 | * | 8/1999 | Kamel et al. | 379/88.19 |
| 6,036,601 | * | 3/2000 | Heckel | 463/42 |
| 6,141,010 | * | 10/2000 | Hoyle | 345/356 |

FOREIGN PATENT DOCUMENTS

WO 99/62013 * 12/1999 (WO).

OTHER PUBLICATIONS

Watt: "Pushing back: broadcast technology streamlines intranet traffic. (digital broadcasting on the internet)(Intra-Net: A Network World Supplement)(Internet/Web/Online Service Infromation)"; Network World, Jan. 20, 1997, v14, n3, pS17, (Abstract Only).*

"Updates.com Delivers the Message with AdSync; (www).updates.com a Free Web–Based Updating Service for PC User's"; Business Wire, Apr. 6, 1999.*

"Feedback"; PC Magazine, Aug. 29, 2000, p. 67.*

Juno and BMG Entertainment Join Forces to Distribute Free E–mail Acorss the United States; New York, NY; Juno home page, Jul. 1996.*

(List continued on next page.)

*Primary Examiner*—Edward R. Cosimano

(57) ABSTRACT

A method and system for offering and distributing software wherein advertisements are incorporated into the software product, wherein author compensation is based on advertisement generated revenues. In accordance with the features of this invention, the advertisements are loaded into the Random Access Memory of the computer whenever the software is invoked and are displayed before the software can be used. Moreover, advertisements are periodically refreshed by automatically accessing computer servers on the Internet and downloading and installing the advertisements on the computer's hard disk and usage records which can be used for author compensation are uploaded to the server. Computer users are given the option of disabling the advertisements by paying for the software.

16 Claims, 5 Drawing Sheets

OTHER PUBLICATIONS

Internet Access: Juno Launches America's First Free Internet E-mail Service; Edge: Work–Group Computing Report, Apr. 1996.*

Creative Multimedia to Distribute Juno Free Internet E-mail on Millions of Billboard CD–ROMs; New York, NY, Aug. 1996.*

Joe Kilsheimer (Orlando Sentinel); Pagoo Takes Calls When the User is Online; Buffalo News, Oct. 1997.*

Bob Gunderman, Paul Weaver; Entrepreneurs Finding Value Low–cost Software Tryouts; Business First—Western New York, Jul. 1997.*

* cited by examiner

METHOD FOR SOFTWARE DISTRIBUTION AND COMPENSATION WITH REPLENISHABLE ADVERTISEMENTS

FIELD OF THE INVENTION

The invention relates generally to software distribution and the Internet and, more specifically, to a method for offering and distributing software and date with replenishable advertisements wherein author compensation is based on advertisement generated revenues.

BACKGROUND OF THE INVENTION

The state of the art for software program and data sales and distribution consists of retail, shareware, and freeware. All three methods are susceptible to abuses such as illegal copying and casual distribution. Such abuses result in significant loss of revenue to software authors companies that produce and sell software.

The retail sale of software programs is identical to other types of retail sales with software programs being sold in stores, through the mail, and more recently, on-line via the Internet. Frequently software and data sold over the Internet are made available to consumers on a trial basis with the trial version of the software program ceasing to function after an interval of time, e.g., thirty days. Retail sale of software is problematic because programs frequently are illegally copied and distributed by a purchaser of a legitimate copy of the software. The software's author receives no compensation for the illegal copies. Moreover, the free trial usage period by some software program retailers is abused by computer users who tamper with the system clock or who simply download a fresh trial version of the software after the trial period has expired.

Shareware distribution of software programs is based upon the honor system. Shareware software programs comprise windows that remind the user to register their purchase and pay the fee so that a code may be received by the user and entered in the shareware software program. After the code is entered, the shareware program stops reminding the use to register the software being used. Shareware programs are most commonly downloaded from the Internet. Share distribution of software is also not an efficient means for collecting revenues for the authors of the software programs. Most users of shareware simply choose to ignore the registration requests and use the software without paying the requested fee.

Freeware software programs are free to the user and do not solicit any form of payment. Freeware software is the most common type of software downloaded from the Internet. Many freeware software programs are distributed by organizations which also solicit donations to fund their activities. Freeware distribution of software programs collects little or no revenues or the authors of a software program.

It is also know that the state of the art for advertising on personal computers (PCs) currently consists of Internet advertising that is displayed using World Wide Web (or Internet) browser software. As users browse the Internet, the various sites they visit display advertisements of a random nature or advertisements that are related to the content of the Web pages being browsed. Although this method of advertisement is growing rapidly it is not ideal in several respects. Web page based advertisements are easy to ignore. They generally occupy a small area of the computer monitor's display and are inconsistent in appearance with the material that hosts them. Internet users quickly adjust and typically ignore advertisements. To solve this problem, Web based advertisements are becoming more striking in appearance and are making use of animation. However, the advertisement's animation requires additional time when loading a Web page into a user's browser and ultimately detracts from the material that hosts the advertisement.

Because of television, most people in this country are accustomed to the concept of viewing advertisements in exchange for having free access to programming. However, people who work rarely, if ever, view traditional media Advertisements (i.e., television ads) during business hours. Similarly, few people access the Internet for casual browsing during business hours, instead saving casual Internet use until evening.

Because evening users are accessing the Internet, they are not watching television and are not watching or hearing traditional advertisements.

Consequently, because of the increase in the number of people who access the Internet in the evening, fewer people are being exposed to main stream advertisements during the time period when traditionally most people viewed advertising on television. For these reasons, it is desirable for the advertisement industry that an effective method of advertising on the Internet should be developed. This advancement would enable the industry to expose users to advertisements both during the work day and especially during the evening hours.

An advancement of the art is needed for distributing software programs that insures equitable payment to the authors and distributors of said programs. Further, advertisements that are difficult to ignore and are viewed whenever the software program is used should be used to generate the payment for these software programs. Without these advertisements, advertisers will continue to face a decreasing number of viewers. As mentioned above, because of radio, television and the print media, consumers are already used to viewing or hearing advertisements as a means to access an otherwise free service.

An additional advancement is needed which allows advertisers to monitor the frequency of use of advertisement sponsored software. In this manner, advertisers and potential advertisers can appropriately determine the value of the advertising rights of any given software program. Moreover to capture the interest of software users, such advertisements should be frequently updated and should allow the consumer to receive additional product information or even purchase the advertised product.

SUMMARY OF THE INVENTION

The invention as disclosed herein realizes a major advancement in the state of the art by providing a means for collecting payment for software programs distributed via the Internet. With this invention, software programs are paid for by sponsors who have advertisements inserted into the programs either prior to or as the software is being downloaded onto a user's computer. In this manner, authors of software programs can guarantee that they will receive payment for their in products. Instead of being damaged, the software authors and sponsors of the advertisements actually receive additional benefit when users copy and distribute software to friends and colleagues. Normally this practice is illegal and deprives authors of rightful revenues. But with this invention, software authors are paid by advertisers and the advertisers actually benefit by widespread distribution of the software. Regardless of the means, distribution insures that a wider audience will view the advertisements and the value of the advertisements will increase.

In addition, the disclosed method of distributing software is consistent with cultural expectations. Our current culture is familiar with free television and radio programming—free only because it is supported by advertisement revenues. The invention as disclosed herein relies on the same principle by providing customized advertisements to distribute and pay for software programs.

Distribution of digitized data other than software will also benefit from the disclosed invention. This is especially true of data made available on the Internet. The data made available with advertisements may be part of a software package, may be formatted by a software shell or may be pure unformatted data. Graphic, audio, or video content could be an example of such data.

In the preferred embodiment of the invention, an Internet Web Server functions as a host computer for storing software programs. The programs are loaded onto the Web Server by their authors making them accessible to Internet users. These users can then access the Web Server, survey the available software stored on the Server, and then download the chosen software for installation and storage on a hard disk or some other storage medium for subsequent use.

Additionally, the Web Server contains software modules comprising one or more advertisements. Typically, the advertisement software modules are compressed visual or audio/visual segments designed to be displayed on Internet users' computer monitors. When the user selects to download a program, the Web Server automatically links a software module to that program. With this embodiment, the original author of the software must write various "hooks" into the software. These hooks allow the advertisement software modules to be written directly into the binary executable image of the software program as that program is downloaded. After the executable image of the software is stamped with one or more advertisement modules, the software program is transmitted to the user's computer using standard Internet file transfer protocols. Further, if the Web Server is connected to a data base, or if the server maintains its own data base, the Server can access data that enables it to determine which advertisement is most appropriate for the individual user. For example, data regarding past software purchases might reveal that the user enjoys sports related games. Most or all of the advertisement modules then would also be sports related, e.g., athletic shoes and other sports related games.

In another aspect of the invention, a plug-in module is downloaded in conjunction with the software program and advertising modules and is installed within the computer's Web browser program. This module enables the content of the advertisements embedded within the software to be periodically updated. The browser plug-in module also enables the host computer to regularly determine the number of times the particular customer has used the downloaded software and viewed the advertisements. The browser plug-in periodically transmits this data to a Web server where it can be accessed by advertisers.

In another aspect of the invention, the software advertisement module can present the user with the option of paying for the software and having the software program deactivated. Typically, the advertisement display will include a screen giving the user this choice. In this embodiment, the plug-in module that was installed within the user's browser program receives billing data for purchasing the software and then forwards the data to the host computer for storage. The plug-in module then deactivates the advertisement feature. In like manner, the advertisement display provides the user an option to receive additional product information or purchase the advertised product. A hyperlink forwards software users to an appropriate host computer which provides the additional information or receives the billing information. After purchases are made, the advertisements can be deactivated or new advertisements can replace existing ones.

In another aspect of the invention, either the program software, the advertisement software module or the browser plug-in module can contain capability to disable the program software. One of these elements monitors the period of time between advertisement updates. If a pre-programmed length of time passes without advertisement updates, then the software is disabled. This advancement prevents users from transferring the software to a computer that does not access the Internet or from disabling the browser plug-in module.

In another aspect of the invention, one plug-in module is capable of managing a plurality of software packages with advertisement software modules that are located on the computer. The plug-in module is downloaded only once, and will manage all of the advertisement modules that a user acquires. Typically, This management functionality is accomplished by the "hooks" built into the software programs that write and read data from a private encrypted database located in the browser's plug-in working directory.

In yet another aspect of the invention, a security "signature" is added to the software program. The signature prevents users from tampering with the advertisement. This feature guarantees that the advertisements will not be disabled unless the users actually purchase the software.

In an alternative embodiment of the invention, the program software, the advertisement module, and the plug-in module can be stored on a compact disk or floppy disk and distributed by one of several traditional retail sales methods. Because the users who purchase the program have already paid for the product, the advertisements and plug-in module remain dormant. However, if the software is copied onto a second computer, either from the original storage medium or via some other medium such as a floppy disk, or if the software is downloaded via a network to a second computer, the advertisements are activated on the new computer and the plug-in module is loaded onto that computer's Web Browser as described above. Because the illegally distributed copies of the software is being paid for by advertisements, the consumer cost of the software package can be significantly less.

With this embodiment of the invention, the advertising software modules are linked to the software program prior to distribution, i.e., prior to sale of the software package on CD ROM or floppy disk. In the instance of the preferred embodiment, wherein the software package is distributed via the Internet, advertisement modules also can be linked to the software prior to distribution either by the software author or when the software is uploaded onto a Web server for distribution.

A technical advantage achieved with the invention is the ability to couple advertisement software with a separate software program.

A further technical advantage achieved with the invention is the ability to compensate software authors for each and every copy of their software being used. Typically, with this invention, the author is compensated by advertisers who advertisements are displayed as the software program is being loaded into Random Access Memory (RAM) for use.

A further technical advantage achieved with the invention is that the advertisements can be replaced periodically with new advertisements.

A further technical advantage achieved with the invention is that advertisers can track the number of computers using software with their advertisements and how frequently the advertisements are being viewed.

A further technical advantage achieved with the invention is that computer users are given the option to stop the advertisements by purchasing the program.

A further technical advantage achieved with the invention is the ability to determine if the computer user has paid for the program and then show the advertisements only on computers whose users have not paid for the program.

A further technical advantage achieved with the invention is the server can designate advertisements to couple with a software program before transmission to a user based on the type of software program chosen by the user or based on the user's purchasing history as stored in a data base.

A further technical advantage achieved with the invention is the use of interactive advertisements.

DETAILED DESCRIPTION OF THE INVENTION

Figure 1:
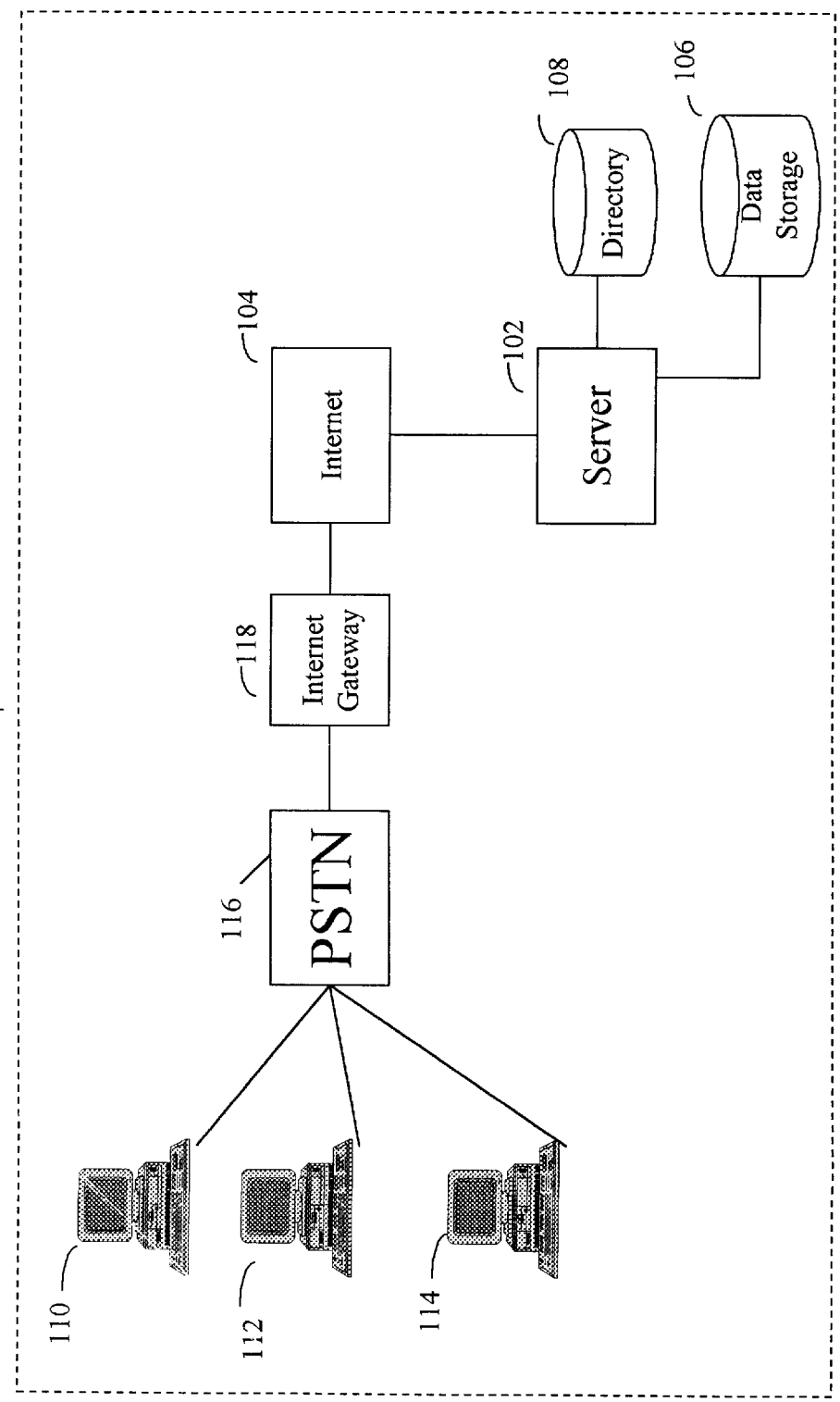
FIG. 1 is a block diagram of a system for accessing and downloading Adware software packages.

In FIG. 1 the reference numeral 100 refers to a system for accessing and downloading a software package that comprises, among other elements, one or more advertisement modules. Software packages comprising advertisement modules hereafter shall be referred to by the product name "Adware Program." Authors of the software (also referred to as "software developers") use the system 100 to make their programs available to computer users. Because of the presence of the advertisements, the cost of the software package is subsidized by advertisers and can be acquired without any cost to the computer user.

The system 100 includes a computer server 102 that resides connected to the Internet 104. It should be noted that in an alternate embodiment the Internet 104 can be any computer network used by consumers to access and purchase goods and services. The server 102 is a typical Internet server currently known by those familiar with the art. Servers such as server 102 are used on the Internet in a configuration commonly referred to as a "client/server" architecture. With a client/server architecture, the server computer receives and responds to commands from a plurality of client computers. Server computers can respond to a variety of commands, e.g., transferring copies of files or programs to a client computer. The commands are usually transmitted from the client computer to the server computer in a protocol known as Hypertext Transfer Protocol (or HTTP). The server 102 can be one of several types of computers, including a personal computer, minicomputer or a main frame computer. Among other elements, the server 102 comprises a data storage medium 106 such as a hard disk, an array of hard disks, or a tape drive. Software authors upload software programs, such as the programs that comprise advertisement modules, to be stored on the data storage 106. The server 102 also comprises at least one directory 108 for recording the names and descriptions of the software packages stored on the data storage 106. Computer users are able to access the directory 108 and read titles and descriptions of the various software packages. The directory 108 can also contain names and descriptions of software packages stored on other servers 102 connected to the Internet. These titles and descriptions would contain hyperlinks that would enable users to readily access the alternative servers 102. The server 102 can be connected to one or more external data bases (not shown). For example, the server 102 can be connected to a billing data base which authorizes (or validates) billing card information for credit or debit card purchases. The server 102 can also be connected to a data base comprising customer purchasing preference information or it can store this information within the data storage 106. The purchasing preference information can be accessed and used when selecting which advertisements to transmit with the Adware package to a given software user, selecting the advertisements based on the past purchasing preferences of the user. For example, advertisements for clothing companies could be attached to software for a user who purchases clothing over the Internet 104.

A plurality of computers, represented by computers 110, 112 and 114, are connected to the Internet 104 via the public switched telephone network 116 and an Internet Gateway 118. It should be noted that the computers 110–114 are the "client" computers referenced above. Currently millions of personal computers and private computer networks are connected to the Internet 104 and that the number continues to grow. The Internet Gateway 118 is one of a plurality of gateways to the Internet 104 operated by Internet service providers. In an alternative embodiment, the computers 110-114 could be connected to the Internet Gateway 118 via a private network or via a non-switched network. For example, a network of computers 110–114 could be connected to an Internet Gateway 118 by a direct trunk connection.

The computers 110–114 are either personal computers (PCs), networked personal computers, computer work stations or any other computer that is able to access the Internet. Typically, the users of computers 110–114 contract with an Internet Gateway 118 provider, who then provides the Internet access service for a fee. Although not shown, the server 102 and the computers 110–114 transmit data via standard protocols such as the Hypertext Transfer Protocol (HTTP). This is a client/server protocol commonly used to access data on the World Wide Web. Further it is important that any transfers of billing data to the server 102 or the transfer of software from the server 102 to the computers 110–114 be secure data transfers. For example, a format known as Secure Sockets Transfer (SST) could be used to establish a secure transmission channel and prohibit the interception or corruption of billing data or of the Adware software package.

The computers 110–114 may be used by software developers to post their software on the server 102. Typically, once the server 102 has been accessed, the developers register their program by inputting their names, addresses and other identification information, system requirements for their software programs, and a description of their programs, including key words. Legal certifications such as a certification of authorship and liability waivers are also obtained. After this preliminary input of information, the software authors then upload their program software to the server 102. Developers can use e-mail, HTTP, or File Transfer Protocol (FTP) for transmitting the software package to the server 102.

Software developers can also use the server 102 to obtain the software modules necessary to attach the advertisements to their programs. In this case, the software developers access the server 102 using a computer 110–114 and register their intent to post Adware software on the server 102. The developers are also assigned an account number which they will use to identify both the developer and the program when it is uploaded onto the server 102. The account number is also used for accounting so that the developers can be appropriately compensated when their software package is downloaded by a consumer. After registration, the developers download a system development kit (SDK) module which contains the software modules necessary to attach and update advertisements. These modules are described by the figures that follow below. SDK modules typically are software modules written in either C++, Java or some other commonly used software language. The developers then write their programs using standard development processes, typically in C++, Java, or some other commonly used software language, and the SDK modules are linked into the program. Alternatively, developers can edit existing programs by linking in the SDK modules. Developers may also receive SDKs via a temporary storage medium such as on floppy disks or CD ROM disks.

After transmission to the server 102, the Adware software package is then stored on data storage medium 106. In addition, the software program name and description are stored in appropriate files for the user directories 108. Key words and other information for identifying a particular software program are also stored in a directory 108. If not already assigned, an account number is then transmitted from the server 102 to the software programmers' computer 110–114. The account number is used to identify the developer for program updates, for an accounting of the number of users who download the authors' programs and for disbursement of payments. In the preferred embodiment, the software module for the advertisements already has been added to the program software by the software author before the software has been downloaded. The advertisement software module can be downloaded from the server 102, or from some other server accessible via the Internet 104, by the author or it can be received via direct modem connection, by U.S. mail on a compact disk or on some other storage medium or by some other means.

As an alternative embodiment, the Adware advertisement software modules can be added to the program software as the program is being downloaded to the data storage medium 106. With this embodiment, the author could actually choose from a list of advertisers who have agreed to sponsor the particular type of program while registering the software. For example, the author of a sports related computer game could choose from sporting goods advertisers. In another embodiment, the advertisement software module can be added to the program software after the software is stored on the data storage medium 106. For both of these alternative embodiments, algorithms within the server's 102 operating software would choose an appropriate advertisement software module to connect to the program based on the description of the program and key words input by the author during registration. As an alternative, the server 102 could check a purchasing preference data base (not shown) in order to determine and attach advertisements that would most likely appeal to a given user.

It should be noted that Adware programs can be loaded onto the server in ways other than described above. For example, the program software can be stored on data storage media such as a floppy disk or a compact disk and can be loaded onto the server by a human server administrator.

As another alternative, instead of providing software programs, the server 102 can make data available to computer users. The data can take many forms, including graphic, audio and/or video data. For example, the data could be a digitized cartoon or video clip or could be financial research data compiled by a securities firm.

With all embodiments described above, computers 110–114 can be used by consumers to access the server 102 in order to shop for and down load software. A user will locate a desired Adware program by using key words and directories 108. After making a selection, the Adware Program is downloaded to the user's computer 110–114. It should be noted that currently established protocols and error correction and security techniques are used when transmitting the Adware program data from the server 102 to the user's computer 110–114.

Figure 2:
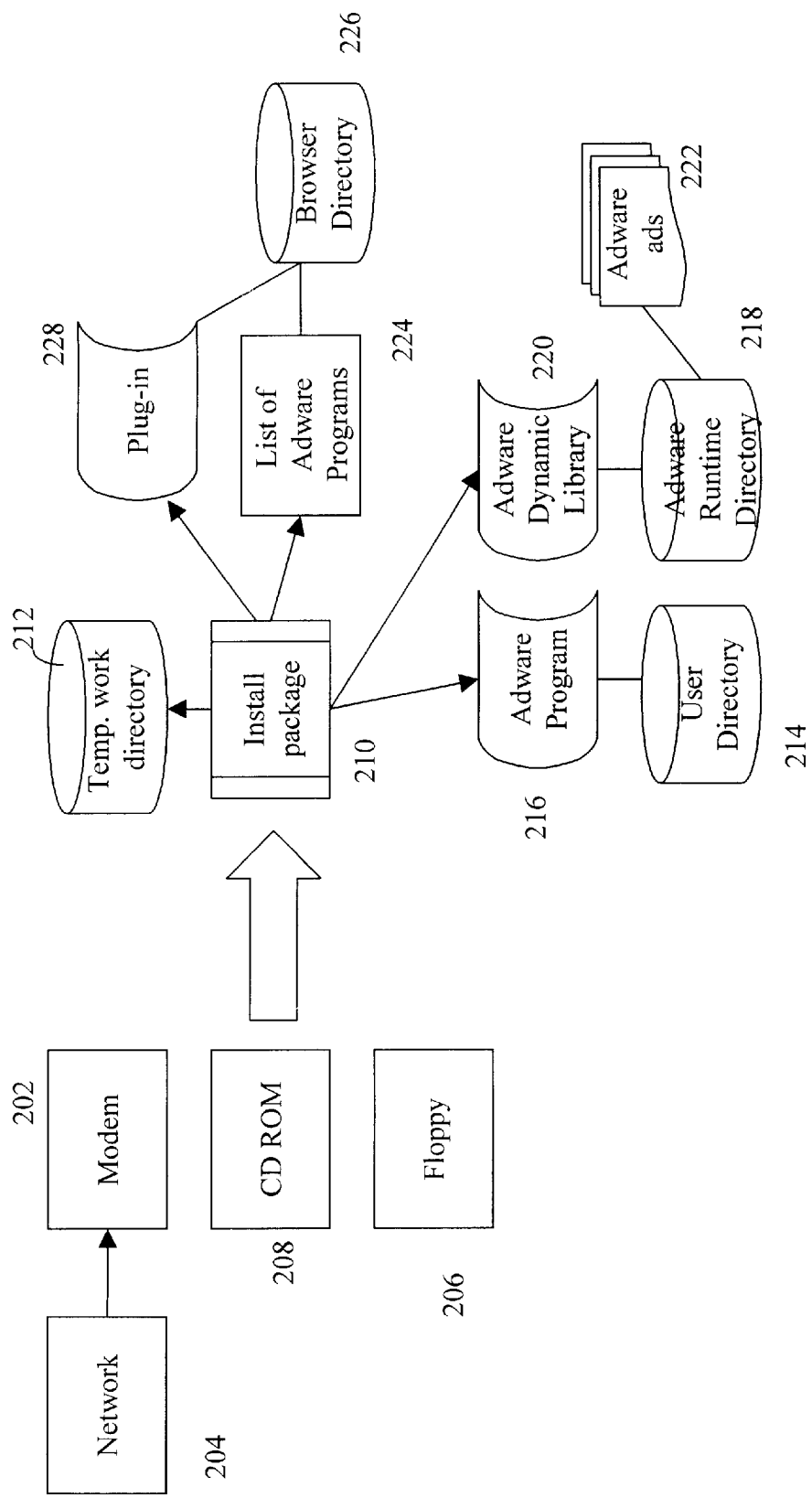
FIG. 2 is a functional block diagram of the installation and operation of an Adware software package.

FIG. 2 is a block diagram illustrating in more detail the functions with which an Adware Program is installed and operates within a user's computer. For the sake of example, this disclosure will assume that the Adware program is being installed on computer 110. Actually any computer that can access the Internet 104, and has sufficient storage and processing capability to store and run the software can successfully download the Adware Program. The network 204 and modem 202 are the preferred embodiment for accessing Adware Programs. The network 204 is representative the public switched telephone network 116, Internet gateway 118, the Internet 104 and numerous servers 102 in FIG. 1. The modem is a standard "off the shelf" modem that resides either internal or external to the computers 110–114. As described in FIG. 1, the Adware Programs are stored on data storage media 106 of the servers 102. With alternative embodiments, an Adware Program is stored on one or more floppy disks 206 or on a read only memory compact disk (CD ROM) 208 and a floppy disk drive or CD ROM drive is used to input the program data. The Adware Program software package can also be stored on a floppy disk 206 or a CD ROM disk 208.

Installation package 210 represents the program installation module of the Adware Program. This module contains the instructions and routines necessary to write the program onto the storage medium (not shown), typically a hard disk drive, of the computer 110. The installation package 210 creates a temporary working directory 212 wherein Adware files from the installation package 210 needed for installing the Adware Program are temporarily stored. The Installation Package 210 then creates a user directory 214 where it records the characteristics and location on the hard disk of the program files. Next the Adware Program Files 216 are written to the hard disk. In addition the Installation Package 210 creates an Adware Run-time directory 218 as a separate directory or as a sub-directory of the of the user directory 214. The directory 218 serves as a directory for the program's dynamic-link library files 220, that is, files with executable routines used to run the Adware program. The Run-time directory 218 also serves as the directory for the files for the Adware Advertisement.

In addition, the installation package 210 adds the program identification and the storage location of Adware program files 216 for the Adware program onto a list of Adware programs and plug-ins 224 within the directory for the Web Browser program, i.e., the Browser Directory 226 or within the system registry. The browser program is one of several commercially available programs that enables computer users to view HTML and other Internet or World Wide Web document types. Most browser programs show document texts, and also display graphic and video files, play audio files and execute small programs, such as Java applets. Browser programs allow users to follow hyperlinked texts and transfer files. Microsoft's Internet Explorer and Netscape's Navigator are well known and readily available Browser Programs. The installation package 210 also installs the Adware plug-in module 228. Typically, plug-in modules are applications or programs designed to assist the operation of the Web Browser. As will be described in FIG. 4, the Adware plug-in module 228 executes advertisement update routines and transmits advertisement viewing data to the server 102. It should be noted that the plug-in module 228 can serve multiple Adware software programs. The plug-in module 228 is not installed if a plug-in module 228 is already resident on the computer 110's hard disk due to the prior installation of another Adware software program. As an exception, if the newer plug-in module 228 is an upgrade of the existing one, then it would replace the older module 228.

In an alternative embodiment, the Adware software is downloaded to a network computer (NC). Typically, network computers do not comprise their own hard disk drives and receive all application software from remote servers. Likewise, with this embodiment, the Adware software is installed on the memory (e.g., hard disk drive) of the remote server. NCs then are able to access the software from the remote server. With each access, the remote server would transmit an advertisement to be displayed on the NC.

Figure 3:
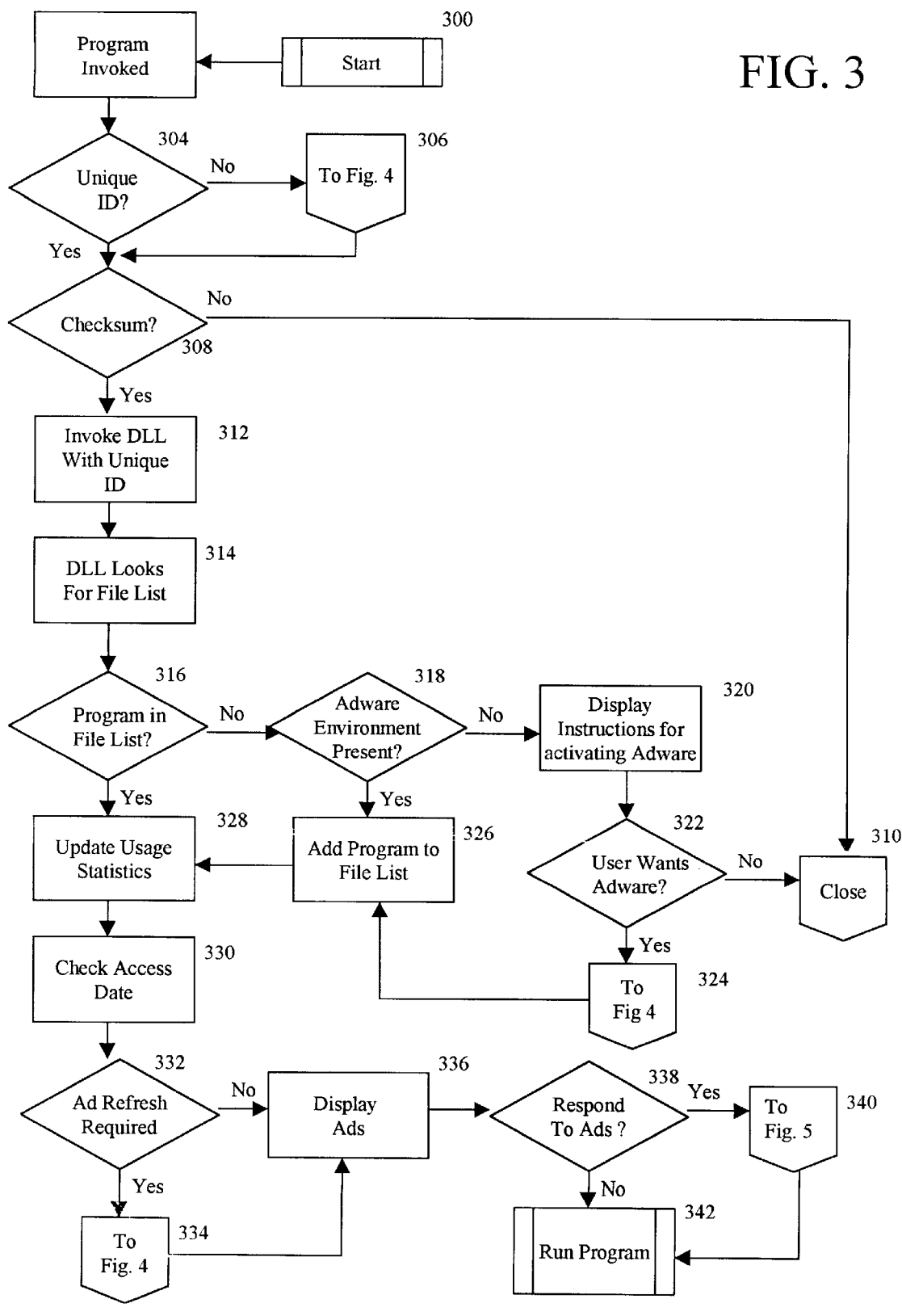
FIG. 3 is a flow chart of the operation of the Adware software program.

FIG. 3 is a flow chart is an illustrative example of the operation of the Adware software program. Specifically, the flow chart describes the execution Adware Advertisement Module 222 in relation to the other elements of the Adware and Browser directories and files. It should be noted that operations and characteristics common to loading and running software programs may not be described below.

Execution begins with step 300 and immediately proceeds to step 302. In step 302, the Adware software program 216 is invoked. There are a number of ways in which a program can be invoked, each depending on the operating system and user graphical user interface of the computer storing the Adware program. Typically, with a windows based graphical user interface, a program is invoked by clicking on a graphical icon with the computer mouse. In response to the command, the program files are loaded into the Random Access Memory (RAM) of the computer.

Then executable files begin executing routines for running the program. In this instances Adware program files 216 and the Adware advertisement module files 222 are loaded into the Random Access Memory (RAM) of the computer. Once these files are loaded into RAM, execution proceeds to step 304. At step 304, determination is made whether the software package has been copied to a different computer. A routine to check the unique identity of the computer is executed, thus verifying that the software has not been downloaded and installed in a different computer. If the unique identity of the computer does not match the identity stored in the Adware File List during installation, a "no" determination is made and execution proceeds to step 306. At step 306, execution proceeds directly to FIG. 4 and advertisements are downloaded installed on the computer 110 hard disk. Execution then returns to step 306 wherein execution proceeds to step 308. Alternatively, advertisement modules that are dormant when the software package is purchased are activated when the unique identity check indicates that the software has been copied to another computer. It should be noted that a "no" determination is only made if the user purchased the software package, either by traditional means, e.g., a retail establishment, or over the Internet as described if FIG. 5. It is anticipated that, if the user pays for the program, then the advertisements will be disabled (see FIG. 5).

If the unique identity of the computer matches the stored identity, or if the user has not paid for the advertisement (and the advertisements have not been disabled, then a "yes" determination is made and execution proceeds to step 308. At step 308, a determination is made whether the files in the advertisement module 222 or any other files in the Adware program have been altered or contain errors of any type. An embedded and encrypted identifier containing a checksum routine for the Adware program is run. The checksum routine comprises a calculated value that is used to identify the presence of errors in the program or, more important to this application, identify whether the Adware program or advertisement modules have been altered or modified in any way. If the encrypted identifier checksum does not match the calculated checksum of the program, a "no" determination is made and the execution proceeds to step 310. At step 310, the program will cease to run. At this point, the computer user will have to reinstall the software package (described with FIG. 2) onto his or her computer 110 in order to use the program. If at step 308, the identifier checksum matches the calculated checksum, execution then proceeds to step 312.

At step 312, the executable files within the Adware module 222 invoke the executable files stored in the dynamic-link library (DLL) 220 by a unique identifier. In an alternative embodiment, for example, in an operating systems not based on OS/2 or Microsoft Windows, instead of invoking dynamic-linked files, a shared library is invoked. In the preferred embodiment, the DLL 220 files begin a routine that, at step 314 searches the Browser plug-in directory 226 for the Adware file list. The Adware file list is an encrypted data file containing data on software usage and advertisement assignments, i.e., data that keeps track of which advertisements have been shown and which advertisement will be shown next. The file list is unique to each computer 110–114 and changes after each use of an Adware software package.

Execution then proceeds to step 316, wherein a determination is made whether the Adware file list has been located, i.e., whether the file list is present on the hard disk. If the list is not found, typically this means that the program was not properly or completely installed or that the program has been altered. If this the case, a "no" determination is made and execution proceeds to step 318. At step 318, a determination is made whether the correct environment, i.e., the correct specifications for program operations, is present. At this point, the absence of the file list and environment indicate that the program has not been properly installed or activated. If the environment is present, a "Yes" determination is made. If however, the Adware program environment is not present, a "no" determination is made and execution proceeds to step 320 and text and/or graphic instructions are output to the computer monitor. These instructions explain to the user how to activate the Adware program. Execution then proceeds to step 322 where a determination is made whether the computer user wants to use the Adware program. Instructions displayed in step 320 typically will include a yes-no type question asking the user if they want to use the program and requiring the user to input an answer. If the answer is "no", a "no" determination is made and execution proceeds to step 310 and the program is closed. If a "yes" determination is made, execution proceeds to step 324, wherein execution proceeds to FIG. 4. In the execution described in FIG. 4, the server 102 is accessed and appropriate Adware advertising modules are downloaded and installed with the entire Advertisement module 222 intact.

Figure 4:
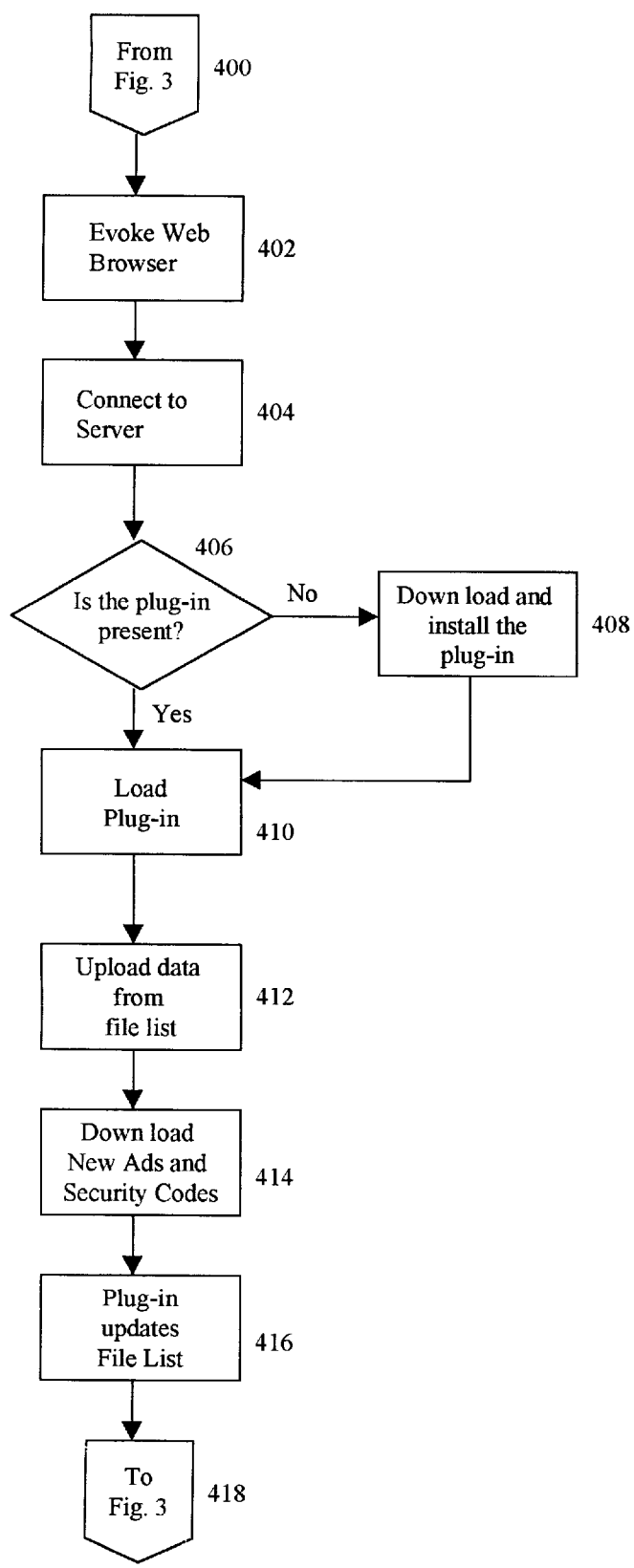
FIG. 4 is a flow chart of the logic executed by the Adware software program for periodically replacing the Adware advertisements.

After installation of the advertising modules, execution proceeds back from FIG. 4 to step 326. At step 326, the Adware program name and a list of the advertisements are added to the file list of Adware programs. Likewise, returning to step 318, if the Adware environment is present, and a "yes" determination is made, execution proceeds to step 326 and the program name and a list of the advertisements are added to the file list. Note that at step 318, the only instance in which the environment is present and the program had not been added to the file list is if the program had not yet been run, or if it had been improperly installed. Execution then proceeds to step 328. Or if the program is in the file list, as determined in step 316, execution proceeds to step 328.

At step 328, the data in the file list is updated. For example, the data showing the number of times the Adware program has been used is increased by one. If multiple advertisements are present in the Advertisement module 222, then the identity of the advertisement that is going to be displayed is also recorded. After recording this and other relevant data in the file list, execution proceeds to step 330. At step 330, a routine is executed where the current date is checked. This date is compared to the date that the Adware software program was installed on the computer 110 or is compared with the date when new advertisements were last received by the advertisement module 222. After checking these dates and making these comparisons, execution proceeds to step 332. At step 332, a determination is made whether new advertisements are needed to replace the advertisements currently stored within the advertisement module 222. This determination may be based on either usage or date comparison of data in the file list. For example, the module software can contain an algorithm that causes the advertisements to be replaced with new ones after the software module for each advertisement has run a certain number of times (e.g., five times). Alternatively, the advertisements could be replaced after a certain amount of time has elapsed, either from the date the software was installed, or from the date when the advertisements were last replaced (e.g., 20 days). If a determination is made that the advertisements should be replaced (a "yes" determination), then execution proceeds to step 334. At step 334 execution proceeds to FIG. 4 wherein a routine is activated to load the computer's Internet software. The Internet software is loaded and a connection is made with the server 102 as described in FIG. 1. Usage data is transmitted to the server 102 and is stored therein to be accessed later by the advertiser. In this manner, the advertiser can correctly determine how many times the advertisement has been viewed. After this transmission, the server downloads the new advertisements. These advertisements are saved to the hard disk of the computer 110, replacing the old advertisements. This process is described in more detail with FIG. 4. After the advertisements have been replaced, execution returns from FIG. 4 to step 336.

If at step 332, a determination is made that the advertisements are not to be replaced, execution then proceeds to step 336. At step 336, an advertisement module is loaded into RAM to be displayed on the computer 110's monitor. The advertisement modules are self contained files or modules within the advertisement module 222. They can contain text, graphics, video, animation, and/or sound. These advertisements also can be interactive and can contain hyperlinks. If the advertisement is interactive or does contain hyperlinks, execution proceeds to step 338. At step 338 a determination is made whether the advertisement is an interactive advertisement. If it is, a "yes" determination is made and execution proceeds to step 340 wherein execution proceeds immediately to FIG. 5. After the interactive session with the advertisement is completed, execution returns from FIG. 5 to step 340 where execution proceeds to step 342. Likewise, if in FIG. 5 the user chooses to purchase the software and the advertisement module is disabled, execution proceeds from FIG. 5 to step 340, wherein execution then proceeds to step 342.

If a determination is made that the advertisement is not interactive, a "no" determination is made and after the advertisement has been completed, execution proceeds to step 342. It should be noted that, if interactive advertisements are not used, execution can skip steps 338 and 340 with execution proceeding directly from step 336 to 342. At step 342, the advertisement module 222 becomes passive and the software program begins to run.

It should be appreciated that, although not shown in FIG. 3, the advertisement modules can remain dormant in the RAM and when the program encounters a busy thread, that is, when the program is saving a file, performing a calculation, etc., an advertisement module can be activated and displayed on the computer monitor. In this case, an alternative version of FIG. 3 is executed, with an advertisement module selected for viewing, and the usage statistics updated. Though technically possible, it would be disruptive to refresh the advertisement modules during busy threads, and the system should instead wait until the next time the program is invoked. It would also be advantageous to use shorter advertisements during the busy threads or have the advertisement terminate once the busy thread is completed. It is possible for a software package to have several different types of advertisements. For example, the software package could contain interactive advertisements for use as the program is being loaded and short static graphic advertisements for use during busy threads. It is also possible to have a "last frame shown" structure within the advertisement wherein any animation used by the advertisement module ends with a suitable static screen display after the busy thread is completed. After displaying the static screen, the advertisement is terminated.

Figure 5:
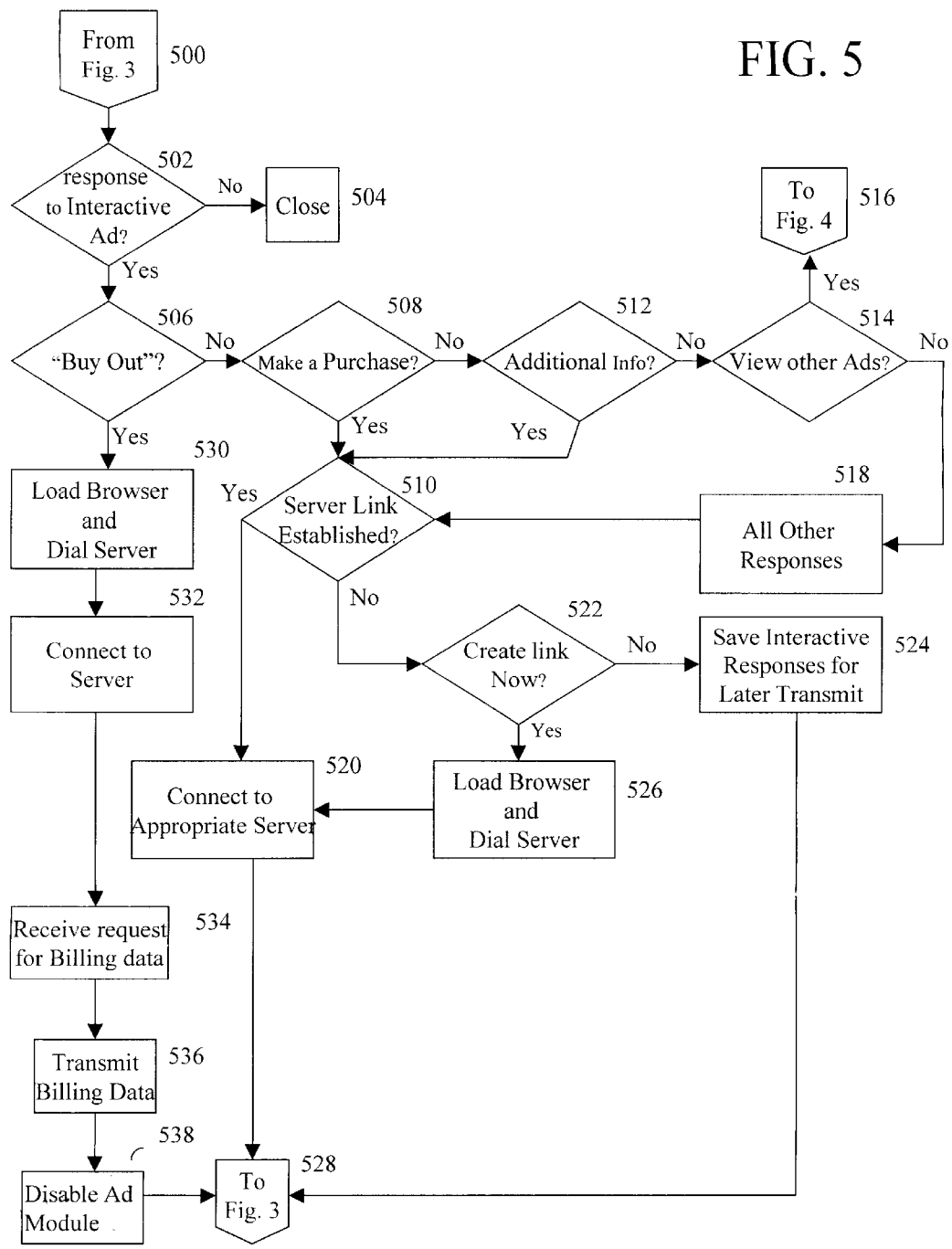
FIG. 5 is a flow chart of the logic executed by an Adware interactive advertisement.

FIG. 4 is a continuation of FIG. 3 illustrating how the Adware advertisements within the advertisement module 222 are periodically replaced by advertisements from the server 102 (FIG. 1). As described above, by changing the content of the advertisements, this feature of the invention helps prevent a user of Adware programs from losing interest and ignoring the advertisements. This feature also enables statistics kept on advertisement viewing to be downloaded from a computer 110–114 to a server 102. These statistics inform advertisers concerning both the frequency their advertisements are being viewed and the number of computers on which their advertisements reside. In instances when the user has downloaded more than one Adware program, statistics also are kept on the number of times each program has been run. All these statistics will help advertisers judge the value of their advertisements and select the type of computer programs they may choose to sponsor. FIG. 4 can also be a continuation of FIG. 5. FIG. 5 presents users with the opportunity of downloading and viewing advertisements other than the advertisements 222.

In FIG. 3, based on the data provided by the file list at step 332, if a "yes" determination is made, execution proceeds to step 334. At step 334, execution proceeds to step 400 of FIG.

4 and then proceeds directly to step 402. Likewise, in FIG. 5, if a "yes" determination is made, execution proceeds to step 400 and then proceeds directly to step 402. At step 402, the Internet Browser program is invoked by the Adware dynamic library and the Browser program is then loaded into the RAM. Once the browser is loaded, execution proceeds to step 404. At step 404, the computer 110 modem out dials and connects the computer 110 to the server 102 as illustrated in FIG. 1. The Adware server 102's world wide web page is then transmitted over network 166 and downloaded into the RAM. Execution then proceeds to step 406 wherein a determination is made whether the plug-in module 228 is present on the hard disk in the Browser Directory 226. It is possible that the plug-in module 228 was not properly installed during the installation illustrated in FIG. 2; that the computer user attempted to remove the plug-in module 228; or that a newer version of the plug-in has subsequently been made available. If the plug-in module 228 is not present or a newer plug-in module is available from the Adware server 102, then a "no" determination is made and execution proceeds to step 408. At step 408 a browser routine is initiated wherein a request for the plug-in module software is transmitted to the server 102 and the plug-in module 228 is downloaded over network 106 from the server 102. The software module is then installed on the hard disk within the browser directory 226 as described in FIG. 2. Execution then proceeds to step 410. Likewise, if at step 406 a determination is made that the plug-in module 228 is present, a "yes" determination is made and execution proceeds directly to step 410. At step 410, the browser plug-in software is loaded into RAM and begins to operate. Among other functions, the plug-in module 228 opens the Adware file list described in step 314 of FIG. 3 and accesses the various data stored therein. Execution then proceeds to step 412 where the plug-in module 228 initiates a routine wherein the data stored in the Adware file list is transmitted via the modem 202 to the server 102 to be stored within data storage 106. As described above, this data can then be made available to server 102 administrators and to advertisers. Execution then proceeds to step 414 wherein the computer 110 receives the download of new advertisement modules and their accompanying security codes. These advertisements are installed onto the computer 110 hard disk in the Adware advertisement module 222. It is then preferred that the existing advertisements in the Adware advertisements module 222 are then deleted. However, the old advertisements can be saved if desired by either the computer user or the program's author. It should also be noted that the order for steps 412 and 414 can be reversed with the advertisement modules downloaded before the file list data is uploaded. Execution then proceeds to step 416 wherein the plug-in module 228 updates the Adware file list. The file lists are re-set to begin receiving new statistics. Execution then proceeds to step 418. At step 418 the flow chart returns to step 334 of FIG. 3 wherein execution proceeds to step 336 and an advertisement is loaded into RAM for display on the computer 110 monitor.

As an alternative embodiment, a user operating a computer 110–114 can access the server 102 and browse the advertisements stored therein or can browse the stored advertisements once the Web browser is connected to the server 102 as illustrated with FIG. 4. Similarly, the advertisements can be updated before the expiration date. This would be accomplished in an instance when a user is browsing the server 102's World Wide Web page or browsing the directory 108 for additional software, or browsing the advertisements stored within the server 102. The plug-in unit is loaded into RAM when the World Wide Web page is first accessed, and the advertisements then are summarily refreshed as described above. This method avoids the inconvenience of programs temporarily expiring until new advertisements are downloaded. This method also insures that the Adware server 102 will be frequently accessed by computer users, thus making the server 102's Web pages ideal sites for displaying additional advertisements. The Adware plug-in also can transmit usage statistics and program information to the server 102 while the computer 110 is still accessing the server 102. Based on the information received from the user's computer 110, the server 102 may then advise the user of any updated version of the installed Adware programs that may be installed for free by selecting the program name from the informative World Wide Web page or from the directory 108 described in FIG. 1.

It should be noted that, in the preferred embodiment, if the computer does not have a modem, if the modem has been disconnected or removed from the computer, or if the modem's link to the public network 116 is disconnected, the Adware program will not run once the internal timer designates that the advertisements should be refreshed or replaced. It is preferred, though not necessary, that the Adware software be designed only to continue to operate as long as advertisements are being shown, and new advertisements periodically replace existing advertisements. However, this would not be the case if the user has purchased the software, either on-line, from a retail store, or from some other source. Then the advertisements would be disabled, if so desired by the user, and would not be reactivated unless the program is copied to another computer.

As described herein, when the software is copied to a second computer, if the advertisements have been disabled, they are reactivated. An exception to this is an instance when an owner of the software first disables the original copy of the software residing on a hard disk of computer 110 in order to legally install the software on a second computer (if the user intends to run the software on more than one computer, and has only paid for the software once, then the advertisements are shown on the second computer). The user must re-register the software, either by accessing a particular customer service server 102 via the Internet 104 or by using a telephone to access a customer service center. Ideally, the user must submit the ID number from the original license agreement and inform the server 102 or the customer service assistant that he or she has purchased the program, disabled the program on the initial computer, and now wants to disable the advertisements. After checking a data base to insure that the software has indeed been purchased and the advertisements disabled, the server 102 transmits a command to the plug-in unit 118 to disable the advertisements. Alternatively, a customer service assistant gives the command to the user to enter into the computer manually using the computer key board.

FIG. 5 is a continuation of FIG. 3 illustrating various system responses to user input to interactive advertisements. It should be noted that not all Adware advertisements will be or should be interactive. Advertisements will be comprised of any combination of print text, graphics, audio, video, and/or animation and may or may not provide for or require user interaction. Advertisements may also include hyperlinks with which the user is able to directly access Internet servers such as the server 102. User interaction does however provide a value to advertisers by accumulating data and by creating an environment in which the user is more likely to purchase the advertised product. Interactive advertisements also provide a value to the user. Interactive advertisements can provide interested users with additional product information and can present the user with the option of immediately purchasing a product. Interactive advertisements can also be made more interesting that regular advertisements. In addition, interactive advertisements can also provide the user with the option to purchase the Adware program and disable the advertisement module.

At step 338 in FIG. 3, a determination was made whether the advertisement was an interactive advertisement. If a "yes" determination was made, execution proceeded to step 340, wherein execution proceeded to FIG. 5 and step 500. Execution then immediately proceeds to step 502. At step 502, a determination is made whether data is input by the user in response to the advertisement. It is known in the art that computer users can input data via a number of different input devices, such as a computer keyboard, mouse, joy stick, or some other input device. These devices are used to collect user inputs in response to on-screen prompts that are created and presented by the interactive advertisement. If the user fails to respond to the interactive advertisement, then a "no" determination is made and execution progresses to step 504. At step 504, the program closes because a response to the interactive advertisement is required before the program runs. In an alternative embodiment, interaction with the advertisement is optional and the execution returns to FIG. 3 at step 340 where the execution proceeds to step 342 and program is executed. In yet another alternative, text, graphics or some other media is output to the monitor explaining to the user that he or she must respond to the advertisement in order to access the program. If at step 502 a determination is made that the user has responded to the advertisement, then execution progresses to step 506. It should be noted that there are numerous ways that an interactive advertisement can be constructed and that a user may interact with that advertisement. For example, the advertisement may contain hyperlinks that will connect the user to an on line server or to other advertising modules. As another example, the advertisement may contain a survey and the user provides answers to questions such as, "What color automobiles do you prefer?" In this instance, the user could manipulate an image of the product with the answers to the survey. Using the example above, the user could manipulate an image of the product with the answers to the survey, i.e., the image of the automobile would turn sky blue in response to the user's response. The interactive advertisement could also output print data to a printer connected to the computer 110 that could print one or multiple coupons or rebate offers. As an incentive, with this option, the advertisement software could postpone printing the coupon or rebate offer until the user answers all the questions in the survey or until the data accumulated in response to the survey is transmitted to a server 102.

At step 506, a determination is made as to whether the user wants to purchase the software in order to disable the advertisement functionality. This determination could be made by answering the question in a survey or by activating a hyperlink with a "yes/no" type answer. If a "no" determination is made, execution proceeds to step 508. Providers of the Adware software or the author of the software may choose to omit this option, in which case execution proceeds to step 508. The interactive software could also give users the opportunity to disable this step, thus making an ongoing decision to view the advertisements rather than purchase the program. At step 508, a determination is made whether the user wishes to purchase the advertised product. As with step 506, this determination may be made by one of several methods, most likely by activating a hyperlink. If the user decides to purchase the product and responds with the appropriate data input, then a "yes" determination is made and execution proceeds to step 510. If however, a "no" determination is made, execution proceeds to step 512. At step 512 a determination is made whether the user desires additional information about the advertised product. For example, the advertisement could be for a new hard drive for a personal computer or for a new Adware software package. The additional information could contain specifications for the hard drive or a sample of the software's functionality. Typically the user responds by activating a hyperlink. If a "yes" determination is made, execution proceeds to step 510. If the user indicates that he or she does not desire additional information, then a "no" determination is made and execution proceeds to step 514.

At step 514 a determination is made whether the user wishes to view other advertisements or replace the advertisements currently saved on the hard disk of the computer 110. If a "yes" determination is made, execution proceeds to step 516 wherein execution then proceeds to FIG. 4. At FIG. 4, as described above, a routine is initiated for downloading new advertisements and the present interactive routine is closed. As an alternative embodiment (not illustrated), the user can be linked to the server 102 or to some other server connected to the Internet 104 and can view advertisements without having them installed onto the computer 110 hard disk. Having accessed other advertisements, options such as those represented in step 508 and 512 can be presented again. If a "no" determination is made, execution proceeds to step 518. Step 518 is representative of all other types of responses possible with an interactive advertisement. These responses primarily represent data that can be helpful to the advertisers, i.e., answers to surveys, consumer opinions on new or existing products, etc. The data may also be used by the advertiser in the future to assist in selling the advertised product or some other product to the user. It should be noted that any of the interactive determinations 506, 508, 512, 514 and 518 may be included in the execution as described herein or may be omitted. It is also possible that the determinations may be made in a different order, i.e., determination 508 made first and 506 made last. After data input in response to the interactive advertisement is completed, execution proceeds to step 510.

At step 510 a determination is made whether the web browser is running and whether a link to the Internet 104 is established. If the browser is running and a link is established, a "yes" determination is made and execution proceeds to step 520. However, if the browser is not running or a link to the Internet 104 is not established, a "no" determination is made and execution proceeds to step 522. At step 522 a determination is made whether the user wants to immediately transmit the interactive data to the server 110 or to another server connected to the Internet 104 or whether the user desires instead to store the data to be transmitted at a later time. If the user determines to store the data, a "no" determination is made and execution proceeds to step 524. At step 524, the response data is saved to the hard disk in a user directory such as the Adware user directory 214. A link is also stored in the Browser plug-in 228 or in the Browser directory 226. When the browser is loaded and the modem 202 establishes a connection with the server 102, the response data is loaded into RAM and then transmitted via the modem 202 to the server 102.

An example of how this is accomplished is that the response data is stored in the plug-in program 228 in the Browser directory 226 or is stored as an Email message and is then placed in the Email outbox (not shown). When the Browser 226 or Email program (not shown) is activated, the response data is transmitted to the appropriate server 102 connected to the Internet 104. Likewise, the user may use interactive responses to request additional product information, but may choose to view the information after use of the Adware program. The request for the data may be transmitted to the server 102 real time or may be transmitted via Email. The user's Email address is also transmitted to the server 102. Additional product information is then transmitted to the user's Email address for the user to access at his or her convenience.

If at step 522 the decision is made to immediately transmit the response data to an appropriate server 102, a "yes" determination is made and execution progresses to step 526. At step 526, the Internet Browser 226 is loaded into the RAM and the modem 202 dials the telephone number of the Internet Gateway 118. Once a connection is made to the Internet 104 execution progresses to step 520. Likewise, at step 510, if a determination is made that a link has been established with the appropriate server 102 or if the browser 226 is loaded into the RAM and a connection is established to the Internet 104, a "yes" determination is made and then execution progresses to step 520. At step 520, the computer 110 is connected to an appropriate server 102 and the response data is uploaded to that server 102. This server 102 can be the server from which the user originally downloaded the Adware program. Or instead, the server 102 could be a server operated by one of the product companies paying for the advertisements. For example, if the user has indicated that he or she wishes to purchase the advertised product, e.g., a PC hard drive, the user is connected to a server 102 with the company's product web page. Typically this type of web page gives the user additional information about their hard drive products and can receive and record the sales data necessary billing and delivery of the purchased product.

Execution then proceeds to step 528 wherein execution returns to FIG. 3.

Returning now to step 506, if the user decides to pay for the Adware program rather than see or hear the advertisements, then a "yes" determination is made and the execution proceeds to step 530. At step 530 the Browser 226 is loaded into the RAM and modem 202 dials the Internet Gateway 118, thus connecting to the Internet 104. Execution then proceeds to step 532 and the computer 110 is connected to a server 102. After connection, execution proceeds to step 534 and the computer 110 transmits a request for the user to purchase the software outright and then receives a request from the server 102 for billing data. This data can be a bank card, credit card such as Visa or American Express, a debit card or some other card, with an account number, used to purchase goods and services. Execution proceeds to step 536 and the user inputs the billing data (name, address, account number of the billing card, and expiration date of the billing) which is transmitted to the server 102. The server 102 saves the billing data for later billing by a billing service. Although not shown, the server 102 can be connected to a billing data base and the billing data can be authorized and validated to ensure that the card is valid and is authorized for use. Execution proceeds to step 538 wherein the Adware advertising module 222 is disabled.

It should be noted however, that the advertisements residing within the advertising module are disabled only for execution on the purchasing user's computer 110. If the Adware program is copied and installed on another computer 112 or 114 or is transmitted via the PSTN 116 or the Internet 104 and installed on another computer 112 or 114, then the Adware advertising module 222 is reactivated and the user will see the advertisements as disclosed herein. The software makes this determination by comparing the computer's operating system serial number or the BIOS serial number with the number stored in the program's memory during installation. Once the module 222 is disabled, execution proceeds to step 528 and execution then proceeds back to FIG. 3.

In an alternative embodiment, a user purchases the Adware software package by some retail or mail order channel. The software is installed using known standard means, such as custom software scripts or a program such as Install Shield 5, or is simply copied from a portable storage medium to the hard disk. The Adware software routine functions as described herein, except that, as the software is evoked, a software routine is activated that stops the advertisement elements and browser plug-in from being evoked. In one embodiment, the user accesses the server 102 in order to register the Adware software product. For example, during the act of registration, the user enters a software activation key that was packaged with the product. The server 102 recognizes that the key is unique and that the software has not been previously registered by another user. After validating the activation key, the server 102 instructs the plug-in 228 to enable an encrypted file to be activated that executes the routine to stop the advertisements from being shown. If, however, the server 102 determines that the supplied activation key has previously been presented, then the encrypted file is not activated and the Adware software activates the advertisements as described above. For computers 110–112 without a modem 202, the user can execute the same registration and activation of the encrypted by using a telephone to call a voice response unit (VRU) or a live operator to register the software. The activation key is entered manually using the telephone's DTMF key pad. After validation, the VRU gives the user a code (e.g., numerical, alpha-numerical) to enter into the computer as part of the registration process. The code is used to activate the encrypted file that stops the advertisements. In either case, each subsequent time the Adware program is started, the program reads and validates the encrypted information that it contains before running the program.

Even though it has not been shown, it should be understood that interactivity may be provided simply to draw attention to the advertisement and make it interesting. Unless the user actually decides to seek additional information or purchase the product, the Adware advertising module would not need to transmit the interactive data to a server 102. In this case, execution would proceed directly from step 518 directly to step 526.

Although illustrative embodiments of the invention have been shown and described, a latitude of modification, change and substitution is intended in the foregoing disclosure and in certain instances some features of the invention will be employed without a corresponding use of other features. For example, alternate transmission means can be used for transmission of data from a computer to the server 102 and for transmission of the Adware software package from the server 102 to the computer 110, including wireless transmissions. In one embodiment transmissions from a computer 110 to the server 102 would be over land based wires, but data transmission broadcasts from the server 102 to computers 110–112 could be carried by standard television signals by encoding the information in the vertical blanking interval of the television signal, a practice well known in the art. Likewise, transmission to and from the server 102 could be over cellular or PCS data carrier networks. As yet another example, instead of providing software, the invention described above may be used for providing data or for providing data and software. Accordingly, it is appropriate that the appended claims be construed broadly and in a manner consistent with the scope of the invention.

What is claimed is:

1. A method for distributing computer software data wherein compensation for the authors and owners of said software data is based upon the viewing an advertisement, the method comprising:

coupling said advertisement to said software data, said coupling requiring the user to view the advertisement before using said software data;

installing said software data and said advertisement to a computer's memory;

recording usage data into a file list for subsequent transmission to a computer server;

periodically accessing said computer server via a network and downloading a new advertisement from said server;

periodically posting said usage data to said server for storage for purposes of compensation;

displaying the advertisement on said computer's monitor before the software data can be accessed by the computer user, said software data being unable to run on said computer unless advertisements are first displayed on said computer's monitor.

2. The method of claim 1 comprising installing said software data and said advertisement onto said computer's hard disk memory from a portable data storage medium such as a floppy disk or a compact disk ROM (CD ROM).

3. The method of claim 1 further comprising coupling said advertisement to said software data as said software data is being downloaded by said computer.

4. The method of claim 1 wherein said computer server comprises means for selecting said advertisement to couple to said software data based on data available to said computer server.

5. The method of claim 1 wherein said advertisement includes software routines for enabling said advertisement to be displayed and additional software and data for the advertisement's content.

6. The method of claim 1 comprising disabling said advertisements if said computer user transmits billing payment data to said computer server in order to purchase said software program.

7. The method of claim 1 wherein said software data includes a computer application program.

8. The method of claim 7 wherein said software data and said advertisement are stored on said computer's hard drive.

9. The method of claim 1 wherein said advertisements are interactive advertisements.

10. The method of claim 9 comprising transmitting said user responses to said interactive advertisements to said computer server.

11. The method of claim 10 comprising storing said user responses to said interactive advertisements until such time as the user chooses to access the Internet and then transmitting said user responses to said computer server.

12. An apparatus for distributing computer software data coupled to at least one advertisement, the apparatus comprising:

a first storage means for storing said software data for distribution to consumers;

telecommunications means to download said software data and said at least one advertisement to a computer;

a first module for requiring the computer to play the at least one advertisement before at least a portion of the software data can be accessed: and a second module for posting information identifying the accessed portion of software data for purposes of compensation.

13. An apparatus of claim 12 further comprising a plug-in unit and an Internet browser program, said plug-in unit residing within said browser program, wherein said plug-in unit for regulating a periodic downloading of new advertisements from said first storage means and transmitting the usage data to said first storage means.

14. A method for distributing computer software data by using advertisements as an alternative to standard retail and wholesale sales, the method comprising:

coupling said advertisements to said software data;

installing said software data and said advertisements to a computer's memory;

coupling requiring a user to view the advertising before the user is able to utilize the software data;

recording usage data to a file list for subsequent transmission to an Internet server; and posting the usage data to the Internet server for the purposes of compensation.

15. A method for distributing computer software data by using advertisements as an alternative to standard retail and wholesales sales, the method comprising:

coupling said advertisements to said software data said coupling requiring the advertising to be played before the software data can be used;

installing said software and said advertisements to a computer's storage;

recording usage data to a file list for transmitting to an Internet server; and posting the usage data to the Internet server for the purposes of compensation.

16. A method for distributing computer software programs and data wherein compensation for the authors and owners of said software and data is based upon the viewing of advertisements as an alternative to standard retail and wholesale sales, the method comprising:

Coupling said one or more advertisements to said software program;

Installing said software program comprising said advertisements to a computer's hard disk;

Loading said software program and said advertisements onto said computer's Random Access Memory (RAM) when the software program is invoked by a computer user;

Recording usage data into a file list for subsequent transmission to a computer server;

Loading a plug-in module into said RAM, said plug-in module regulating the downloading of said advertisements and transmitting of said usage data;

Periodically accessing said computer server via the Internet and downloading said new advertisements from said server and installing said advertisements onto said hard disk of said computer;

Periodically transmitting said usage data to said server for storage;

Displaying the advertisement on said computer's monitor before software is activated for use by the computer user, said software for said program unable to run on said computer unless advertisements first displayed on said computer's monitor;

Accessing said software program and said advertisements by said computer via the Internet; and Posting said software by uploading said software onto said server and registering the said posting of said software so advertisers will know the identity of the author for purposes of compensation.

* * * * *